(12) United States Patent
Hilsdorf et al.

(10) Patent No.: US 6,934,054 B1
(45) Date of Patent: Aug. 23, 2005

(54) METHOD AND APPARATUS FOR TWO-COLOR THERMAL POINT OF SALE (POS) PRINTING

(75) Inventors: Steven P. Hilsdorf, Willseyville, NY (US); Stephen R. Payne, Cortland, NY (US)

(73) Assignee: TransAct Technologies Incorporated, Wallingford, CT (US)

( * ) Notice: Subject to any disclaimer, the term of this patent is extended or adjusted under 35 U.S.C. 154(b) by 974 days.

(21) Appl. No.: 09/633,003

(22) Filed: Aug. 4, 2000

(51) Int. Cl.$^7$ .......................... G06F 15/00; G06K 1/00
(52) U.S. Cl. ...................... 358/1.9; 358/1.8; 358/3.23; 358/503; 358/515; 347/171; 347/172; 347/184; 347/191
(58) Field of Search ................ 358/1.9, 1.8, 3.23, 358/503, 515, 323; 347/171, 172, 184, 191

(56) References Cited

U.S. PATENT DOCUMENTS

| | | | |
|---|---|---|---|
| 4,589,035 A * | 5/1986 | Yamanishi et al. ......... 358/296 |
| 4,638,332 A * | 1/1987 | Sakura et al. ............... 347/174 |
| 4,641,147 A * | 2/1987 | Sakura et al. ............... 347/174 |
| 4,748,453 A | 5/1988 | Lin et al. |
| 4,873,570 A | 10/1989 | Suzuki et al. |
| 4,908,779 A * | 3/1990 | Iwata .......................... 345/593 |
| 5,073,049 A * | 12/1991 | Numata et al. ............... 400/54 |
| 5,345,320 A | 9/1994 | Hirota |
| 5,543,828 A * | 8/1996 | Minowa ...................... 347/195 |
| 5,581,375 A | 12/1996 | Ma |
| 5,675,717 A | 10/1997 | Yamamoto |
| 5,680,230 A | 10/1997 | Kaburagi et al. |
| 5,734,484 A * | 3/1998 | Yamamoto et al. ......... 358/500 |
| 5,809,214 A * | 9/1998 | Nureki et al. ................ 358/1.8 |
| 5,812,169 A * | 9/1998 | Tai et al. ..................... 347/110 |
| 6,206,504 B1 * | 3/2001 | Payne .......................... 347/43 |
| 6,315,392 B1 | 11/2001 | Kinas et al. |
| 6,462,834 B1 * | 10/2002 | Yamamoto et al. .......... 358/1.9 |
| 6,502,923 B2 | 1/2003 | Payne |
| 6,523,937 B1 | 2/2003 | Payne |

FOREIGN PATENT DOCUMENTS

| | | |
|---|---|---|
| EP | 0 596 505 A1 | 11/1993 |
| EP | 0 671 354 | 9/1995 |
| JP | 09147235 | * 6/1997 |
| JP | 09327939 | 12/1997 |
| JP | 10058755 | * 3/1998 |
| JP | 11127360 | * 11/1999 |

* cited by examiner

*Primary Examiner*—Kimberly Williams
*Assistant Examiner*—Michael Burleson
(74) *Attorney, Agent, or Firm*—Lipsitz & McAllister, LLC

(57) ABSTRACT

A 2-color thermal point of sale (POS) printer includes a converter for converting full color printing commands into a commands for printing in two colors, a primary color and an alternate color. A three color image is possible when using the background color of the paper as a color.

31 Claims, 1 Drawing Sheet

METHOD AND APPARATUS FOR TWO-COLOR THERMAL POINT OF SALE (POS) PRINTING

FIELD OF THE INVENTION

The invention pertains to the field of thermal printers, and in particular, to a point-of-sale (POS) printer that prints two colors.

BACKGROUND OF THE INVENTION

There are two ways to define colors, CMY and RGB. CMY stands for Cyan, Magenta, and Yellow. Mixing cyan, magenta, and yellow can be compared to blending paint. When cyan, magenta, and yellow are amalgamated together, the result is black. CMY is sometimes known as CMYK, which stands for Cyan, Magenta, Yellow and Black (so as not to be confused with Blue). These colors are sometimes called process colors, because you use them in four-color printing. In a typical full color printer, the inks used consist of these primary colors. The term "primary colors" mean that mixing these colors together can create all colors. Cyan, magenta and yellow are theoretically all one needs, but to save costly color inks many printers also have a black cartridge. The CMY color model is called a subtractive color model, because the process ink pigments "subtracts" or absorbs certain colors and reflects others.

RGB stands for red, green, and blue. Mixing red, green, and blue together can be compared to blending light beams. When the lights off, everything looks black. If all the lights are on, the result is white. The RGB model is used in a television or computer monitor. The colored spots of a TV screen emit three colors, and the sum of these colors determines the color you see. This is called an additive color model. Each color in the RGB system has a value for the amount of Red, Green and Blue in each picture element (pixel). In the internal Microsoft® Windows® image descriptions, this value goes from 0 to 255, where 0 for all three colors equals black, and 255 for all three colors equals white. This means that one can get more than 16 million different colors (TrueColor) because 256*256*256=16,777,216, but one can only get 256 shades of gray.

A full color printer forms the various colors of an image by mixing inks of different colors on the paper. That is, a full color printer uses the CMY or CMYK color system. The amount of each color determines the hue. Typically the paper is white and no ink produces a white dot. Mixing yellow and cyan produces a red dot and mixing cyan, magenta, and yellow in equal amounts produces a black or gray dot.

Hue describes what shade of color a particular color is, such as red, orange, indigo, or green. As in the rainbow, the starting and ending color is red. Hue can be described as a color circle with red at 0 degrees, yellow at 60 degrees clockwise, continuing with green, cyan, blue, magenta, and red again at 360 degrees. Saturation is a term used with how bright the color is.

There are a number of different types of printers commercially available, but not all types are suited to be POS printers. POS printers are used to print cash register receipts or credit card charge statements. Full color printing is not required, nor is the ability to print on different types of paper. POS printers tend to be compact so as not to clutter up a cashier's work area.

Many types of POS single color printers are commercially available. Dot matrix printers, thermal printers, and ink jet printers are all used because of their speed and reliability. POS color printers are rare in the marketplace. POS dot matrix color printers require a multi-colored ribbon, which adds to the complexity and size of the printer. Color ink jet printers are unsuitable for POS printers because adding three additional ink jet cartridges for full color (also known as 4-color, i.e., three colors plus black) would add width and complexity to the printer. Color thermal printers are under development, but it is hard to do color graphics on a thermal printer. In addition, special paper is required.

SUMMARY OF THE INVENTION

Briefly stated, a 2-color thermal point of sale (POS) printer includes a converter for converting full color printing commands into a commands for printing in two colors, a primary color and an alternate color. A three color image is possible when using the background color of the paper as a color.

According to an embodiment of the invention, a method of converting a full color image to a two color image for a thermal printer, wherein the two colors are a primary color and a secondary color, includes (a) providing a color image on a host computer as display pixels, wherein the color image includes a combination of none, one, two, or all three of a first color, a second color, and a third color; (b) converting each pixel to a corresponding printer command; (c) determining a primary color value and a secondary color value for each of the printer commands based on an intensity of the first color, the second color, and the third color present in the pixel; (d) comparing each of the primary and secondary color values for each printer command to a given threshold and designating a color value as ON if it exceeds a given threshold, and designating a color value as OFF if it is below or equal to the given threshold; (e) performing a logical OR operation on the primary and secondary color values to produce a secondary value; (f) loading the secondary value into a secondary print buffer; (g) printing nothing if the secondary value is OFF and printing the secondary color if the secondary value is ON; (h) loading the primary color value into a primary print buffer; and (i) printing the primary color if the primary color value is ON.

According to an embodiment of the invention, an apparatus for converting a full color image to a two color image for a thermal printer, wherein the two colors are a primary color and a secondary color, includes means for providing a color image on a host computer as display pixels, wherein the color image includes a combination of none, one, two, or all three of a first color, a second color, and a third color; means for converting each pixel to a corresponding printer command; means for determining a first color value, a second color value, and a third color value for each of the printer commands based on an intensity of the first color, the second color, and the third color present in the pixel; means for comparing each of first, second, and third color values for each printer command to a given threshold and designating a color value as ON if it exceeds a given threshold, and designating a color value as OFF if it is below or equal to the given threshold; means for performing a logical OR operation on the primary and secondary color values to produce a secondary value; means for loading the secondary value into a secondary print buffer; means for printing nothing if the secondary value is OFF and printing the secondary color if the secondary value is ON; means for loading the primary color value into a primary print buffer; and means for printing the primary color if the primary color value is ON.

DETAILED DESCRIPTION OF THE PREFERRED EMBODIMENT

Figure 1:
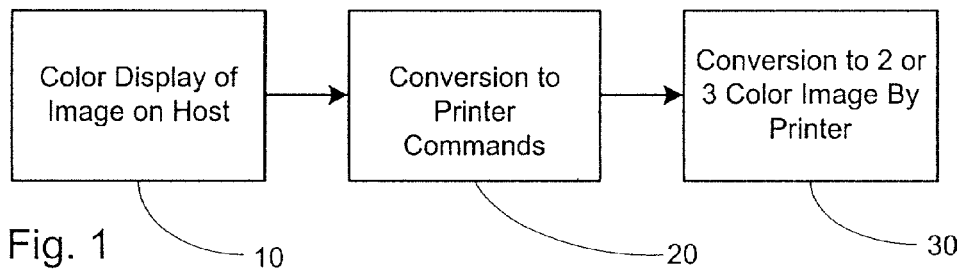
FIG. 1 shows a system according to an embodiment of the invention.

Referring to FIG. 1, a host system 10 contains a color image to be printed. Host system 10 is typically some type of computing device, preferably a PC or equivalent. The image is contained in the memory of host system 10, including color information for the image. "Color information" as used in this application means a color as that term is generally known, such as green, red, blue, yellow, orange, etc., but excluding black and white. The term "color" by itself includes black and white.

A driver 20 converts the image from host system 10 into commands that a printer 30 can understand. Various printer command protocols are known to those in the art. Driver 20 can be implemented in hardware, software, or a combination of hardware and software, and can be a separate device or contained in either host system 10 or printer 30.

Printer 30 converts the color information received from driver 20 into a printed image that contains a primary color, a secondary color, and a background color. The primary color and secondary color are provided by thermal paper that has two colors encapsulated in the paper. As the paper is heated, the ink is released into the paper. If the paper is heated only for a short period of time, the secondary color is released. If the paper is heated for a longer period of time, the primary color is also released. The primary color overpowers, or in some cases, mixes with, the secondary color. Thus, with a primary color of black and a secondary color of red, the black overpowers the red and the print dot appears black. The background color (base color) is provided by the paper stock the image is printed on. The background color (base color) is usually white since most paper, including that typically used for receipts, is white. The primary color is usually black and the secondary color is usually red, but any colors can be used as long as they are available on thermal paper.

A "color value" is defined as any combination of data that defines the intensity of a color for a dot/pixel. In the plural, "color values" means a combination of one or more color values that makes up all the color intensity information for a dot/pixel, since display pixels can include varying amounts of red, green, and blue (RGB) or cyan, magenta, and yellow (CMY). If a color value for a particular color exceeds a given threshold, that color value is ON. If a color value for a particular color is below a given threshold, that color value is OFF.

The preferred coding for converting a fill color image to a thermal 2-color image is as follows. Two print buffers are required: a secondary color print buffer and a primary color print buffer. Because the primary color can never be printed without the secondary color also being printed, a conversion is required between the color values and the print buffers. The secondary print buffer is loaded first with the results of a logical OR operation between the primary color value and the secondary color value. In other words, if either the secondary color value or the primary color value are ON, the secondary print buffer is ON. If neither the secondary color value or the primary color value are ON, the secondary print buffer is OFF. The secondary print buffer is then sent to the print head.

Once the secondary print buffer is sent to the print head, the primary print buffer is loaded. The primary print buffer is directly loaded with the primary color value, i.e., if the primary color value is ON, the primary print buffer is ON, while if the primary color value is OFF, the primary print buffer is OFF. The primary print buffer is then sent to the print head.

If the secondary print buffer and the primary print buffer are both OFF, no color is printed and the base color is present. If only the secondary print buffer is ON, the secondary color is present. If both the primary and secondary print buffers are ON, the primary color is present. The primary print buffer can never be ON without the secondary print buffer also being ON. Color values communicated to printer 30 for a particular dot/pixel that do not fit the aforementioned cases are ignored, i.e., no color is printed resulting in a dot of the background color.

There are some special considerations printing images on a 2-color thermal printer. The driver in printer 30 converts colors that the printer cannot print into an image as best it can. Color in the image that the printer does not have will not be printed. An example of this is an image that has green in it being printed when the thermal paper only has black and red inks in it. The green content in the image is not printed. Conversely, if an image has orange content, then it is printed as red on the printer. This red print would result because orange has a red component to it.

Color intensity also has an impact on how graphic images print on the printer. If a color's intensity is too low, then it is not printed. If a color's intensity is very high, i.e., dark, it may get printed in black.

Figure 2:
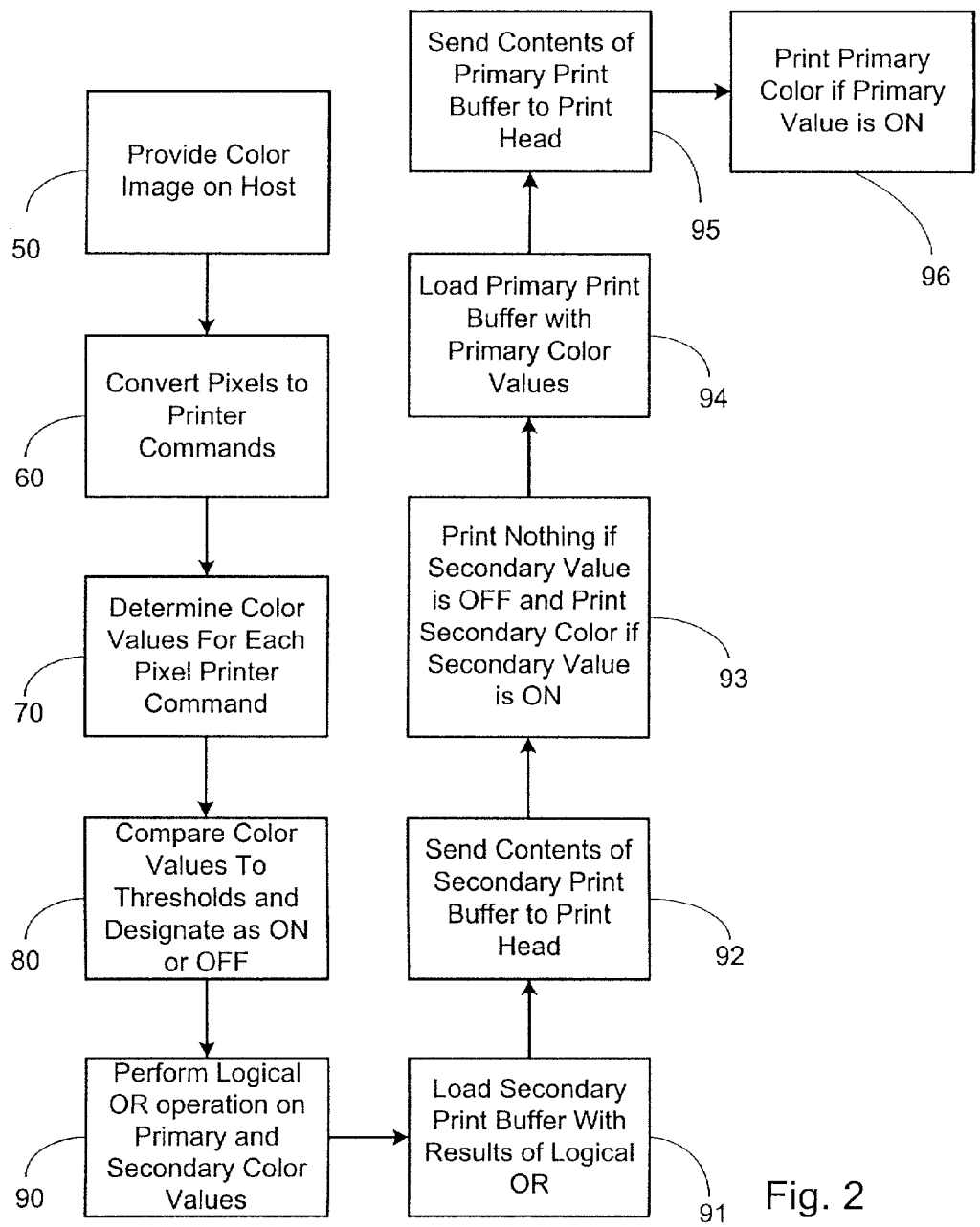
FIG. 2 shows a method for converting a full color image to a two color image according to an embodiment of the present invention.

Referring to FIG. 2, the method of the invention is shown in abbreviated form. The color image is provided on the host in step 50. The pixels of the image are converted in step 60 to printer commands. The color values for each pixel are determined in step 70. Then in step 80, the color values are compared to a specified threshold and designated as either ON or OFF. In step 90, the logical OR operation is performed on the primary and secondary color values. The secondary print buffer is loaded in step 91 with the results of the logical OR operation, and the contents of the secondary print buffer are sent to the print head in step 92. In step 93, nothing is printed if the secondary value is OFF, but the secondary color is printed if the secondary value from the logical OR operation is ON. This ensures that even if the original secondary color value is OFF but the primary color value is ON, the thermal paper is heated as required to print the primary color. The primary print buffer is then loaded in step 94, after which the contents of the primary print buffer are sent to the print head in step 95. If the primary color value is ON, the primary color is printed.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of converting a full color image to a two color image for a thermal printer, wherein said two colors are a primary color and a secondary color, comprising:

providing a color image on a host computer as display pixels, wherein said color image includes a combination of none, one, two, or all three of a first color, a second color, and a third color;

converting each pixel to a corresponding printer command;

determining a primary color value and a secondary color value for each of said printer commands based on an intensity of said first color, said second color and said third color present in said pixel;

comparing each of said primary and secondary color values for each printer command to a given threshold and designating a color value as ON if it exceeds a given threshold, and designating a color value as OFF if it is below or equal to said given threshold;

performing a logical OR operation on said primary and secondary color values to produce a secondary value;

loading said secondary value into a secondary print buffer;

printing nothing if said secondary value is OFF and printing said secondary color if said secondary value is ON;

loading said primary color value into a primary print buffer; and printing said primary color if said primary color value is ON.

2. A method according to claim 1, wherein said first, second, and third colors are red, green and blue, in any order.

3. A method according to claim 1, wherein said first, second, and third colors are cyan, magenta, and yellow, in any order.

4. An apparatus for converting a full color image to a two color image for a thermal printer, wherein said two colors are a primary color and a secondary color, comprising:

means for providing a color image on a host computer as display pixels, wherein said color image includes a combination of none, one, two, or all three of a first color, a second color, and a third color;

means for converting each pixel to a corresponding printer command;

means for determining a primary color value and a secondary color value for each of said printer commands based on an intensity of said first color, said second color and said third color present in said pixel;

means for comparing each of said color values for each printer command to a given threshold and designating a color value as ON if it has a first relationship to a given threshold, and designating a color value as OFF if it has a second relationship to said given threshold;

means for performing a logical operation on said color values to produce a secondary value;

means for loading said secondary value into a secondary print buffer;

means for printing nothing if said secondary value is OFF and printing said secondary color if said secondary value is ON;

means for loading said primary color value into a primary print buffer; and means for printing said primary color if said primary color value is ON.

5. An apparatus according to claim 4, wherein said first, second and third colors are red, green and blue, in any order.

6. An apparatus according to claim 4, wherein said first, second, and third colors are cyan, magenta, and yellow, in any order.

7. A method of converting a full color image to a two color image for printing by a thermal printer, wherein said two colors are a primary color and a secondary color, comprising the steps of:

providing first dots defining said full color image, said first dots having a combination of none, one, two, or all three of a first color, a second color, and a third color; and determining a plurality of printer commands representing second dot data to be printed in said two color image, said second dot data being in a form of binary primary color dot data and binary secondary color dot data derived from said first dots.

8. A method according to claim 7, further comprising the step of printing said second dot data on a thermal substrate.

9. A method according to claim 8, wherein said step of printing is performed on a two-color point-of-sale printer.

10. A method according to claim 8, wherein:

said thermal substrate has a background color, a primary encapsulated color, and a secondary encapsulated color, and a three color output is provided by using said primary encapsulated color as the first color, said secondary encapsulated color as the second color, and said background color as the third color.

11. A method according to claim 7, wherein said full color image is provided on a host computer with said first dots comprising display pixels.

12. A method according to claim 11, wherein said step of determining includes determining a primary color value and a secondary color value for use in providing said second dot data based on an intensity of said first color, said second color, and said third color present in a corresponding display pixel.

13. A method according to claim 7, wherein said step of determining includes determining a primary color value and a secondary color value for use in providing said second dot data based on an intensity of said first color, said second color, and said third color present in a corresponding first dot of said full color image.

14. A method according to claim 7, wherein said step of determining comprises:

determining first, second, and third color values for said first color, said second color, and said third color, respectively;

comparing each of said first, second, and third color values to a given threshold;

associating a color value with a first state if it has a first relationship to said given threshold;

associating a color value with a second state if it has a second relationship to said given threshold; and providing a printer command representing second dot data in the form of:

(a) primary color dot data if all color values are associated with said second state, (b) primary color dot data if said first color value is associated with said first state and said second and third color values are associated with said second state and said primary color is said first color; and (c) secondary color dot data if said first color value is associated with said first state and said second and third color values are associated with said second state and said secondary color is said first color.

15. A method according to claim 14, comprising:

providing a printer command representing second dot data in the form of:

(d) no-print dot data if all color values are associated with said first state.

16. A method according to claim 7, further comprising sending said printer commands to a printer.

17. A method according to claim 7, wherein said printer commands are generated at a printer.

18. A method according to claim 7, wherein said first, second, and third colors are red, green, and blue, in any order.

19. A method according to claim 7, wherein said first, second, and third colors are cyan, magenta, and yellow, in any order.

20. Apparatus for converting a full color image to a two color image, wherein said two colors are a primary color and a secondary color, comprising:
   a host computer adapted to display said full color image as a combination of none, one, two, or all three of a first color, a second color, and a third color; and
   a processor adapted to provide a plurality of printer commands representing individual dot data from said image in a form of binary primary color dot data and binary secondary color dot data.

21. Apparatus in accordance with claim 20 wherein said processor resides in said host computer.

22. Apparatus in accordance with claim 21 wherein said host computer further comprises a communication port for forwarding said printer commands to a printer.

23. Apparatus in accordance with claim 20 wherein said processor resides in a printer coupled to receive color information representative of said full color image from said host computer.

24. Apparatus in accordance with claim 20, further comprising a thermal printer adapted to print said individual dot data on a printable medium.

25. Apparatus in accordance with claim 24, wherein:
   said printable medium is a thermal substrate having a background color, a primary encapsulated color, and a secondary encapsulated color, and
   a three color output is provided by using said primary encapsulated color as the first color, said secondary encapsulated color as the second color, and said background color as the third color.

26. Apparatus in accordance with claim 20, further comprising a two-color point-of-sale printer adapted to print said individual dot data on a printable medium.

27. Apparatus in accordance with claim 20, wherein said first, second, and third colors are red, green, and blue, in any order.

28. Apparatus in accordance with claim 20, wherein said first, second, and third colors are cyan, magenta, and yellow, in any order.

29. A computer memory device storing program code for conversion of a full color image to a two color image for printing, wherein said two colors are a primary color and a secondary color, said conversion comprising:
   identifying first dots defining said full color image, said first dots having a combination of none, one, two, or all three of a first color, a second color, and a third color; and
   determining a plurality of printer commands representing second dot data to be printed in said two color image, said second dot data being in a form of binary primary color dot data and binary secondary color dot data derived from said first dots.

30. A computer memory device according to claim 29, wherein said program code is adapted to send said printer commands to a printer.

31. A computer memory device according to claim 29, wherein said determining step is performed at a printer.

* * * * *